US006842487B1

(12) United States Patent
Larsson (10) Patent No.: US 6,842,487 B1
(45) Date of Patent: Jan. 11, 2005

(54) CYCLIC DELAY DIVERSITY FOR MITIGATING INTERSYMBOL INTERFERENCE IN OFDM SYSTEMS

(75) Inventor: Peter Larsson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 734 days.

(21) Appl. No.: 09/667,504

(22) Filed: Sep. 22, 2000

(51) Int. Cl.[7] .......................... H04K 1/10; H04L 27/28
(52) U.S. Cl. ........................................ 375/260; 455/10
(58) Field of Search ................................ 375/260, 267, 375/430, 347, 348; 455/562.1, 101

(56) References Cited

U.S. PATENT DOCUMENTS

| | | | | |
|---|---|---|---|---|
| 5,487,069 A | * | 1/1996 | O'Sullivan et al. ......... | 370/404 |
| 6,005,894 A | * | 12/1999 | Kumar ........................ | 375/270 |
| 6,473,467 B1 | * | 10/2002 | Wallace et al. ............. | 375/267 |
| 6,549,544 B1 | * | 4/2003 | Kroeger et al. ............. | 370/482 |
| 6,580,705 B1 | * | 6/2003 | Riazi et al. ................. | 370/347 |
| 6,594,473 B1 | * | 7/2003 | Dabak et al. ............... | 455/101 |
| 6,661,771 B1 | * | 12/2003 | Cupo et al. ................. | 370/204 |

FOREIGN PATENT DOCUMENTS

| | | |
|---|---|---|
| DE | 196 44 430 C1 | 12/1997 |
| EP | 0 588 741 A1 | 3/1994 |

OTHER PUBLICATIONS

Ye Li et al., "Transmitter Diversity of OFDM Systems and Its Impact on High-Rate Data Wireless Network", IEEE Journal on Selected Areas in Communication, Jul. 7, 1999, pp. 1233–1243, X–000834945 vol. 17.

Seongsik Lee et al., "Trellis–Coded OFDM Signal Detection with Maximal Ratio Combining and Combined Equalization and Trellis Decoding", IEICE Trans Commun, Apr. 1997, pp. 632–638, XP–000721839 vol. E80 B No. 4.

European Patent Office Standard Search Report dated Mar. 30, 2001.

* cited by examiner

*Primary Examiner*—Stephen Chin
*Assistant Examiner*—Harry Vartanian (57) ABSTRACT

A method and/or an apparatus for mitigating intersymbol interference. In systems which employ transmission diversity when transmitting symbols which have a guard interval, the multiple versions of the transmitted symbols have the samples of the transmitted symbols shifted relative to each version transmitted. The shifted samples of the transmitted symbol are shifted from the end of the transmitted symbol into the beginning of the transmitted symbol. A last number of samples of the transmitted symbol are copied and placed in the guard interval which precedes the symbol. The guard interval and the symbol are transmitted to a receiver.

21 Claims, 10 Drawing Sheets

$\rho = 1$
$k-k' = 0$

FIG. 13A $\rho = 0$
$k-k' = N/4$
$\Rightarrow t_1 = 1, t_2 = 2, t_3 = 3$

FIG. 13B $\rho = 0$
$k-k' = N/2$

CYCLIC DELAY DIVERSITY FOR MITIGATING INTERSYMBOL INTERFERENCE IN OFDM SYSTEMS

BACKGROUND

The present invention relates to transmission diversity. More particularly, the present invention relates to mitigating intersymbol interference in systems which employ delay transmit diversity.

In radio transmissions, a transmitted signal may be deflected off buildings or other obstacles between a transmitter and a receiver. The deflection may cause a receiver to receive multiple versions of the transmitted signals with different time delays. The reception of a transmitted signal which is deflected off objects and the reception of multiple time delayed versions of the transmitted signal is known as multipath propagation. In digital transmissions, if the delay between the multiple paths exceeds the symbol duration, signal distortion known as intersymbol interference (ISI) is generated. Various transmission schemes are designed to mitigate ISI. One type of transmission scheme which is particularly suited for mitigating ISI is known as orthogonal frequency division multiplexing (OFDM). OFDM divides a bandwidth into a number of small subcarriers. Through the use of orthogonal functions, the spectrum of all subcarriers can mutually overlap, thus yielding optimum bandwidth efficiency. However, when the delay difference between multiple paths exceeds the minimum sampling interval the orthogonality between subcarriers is destroyed. To maintain the condition of perfect orthogonality between subcarriers in a multipath environment, a guard interval, or cyclic prefix (CP), is inserted before the transmission of each symbol.

Figure 1:
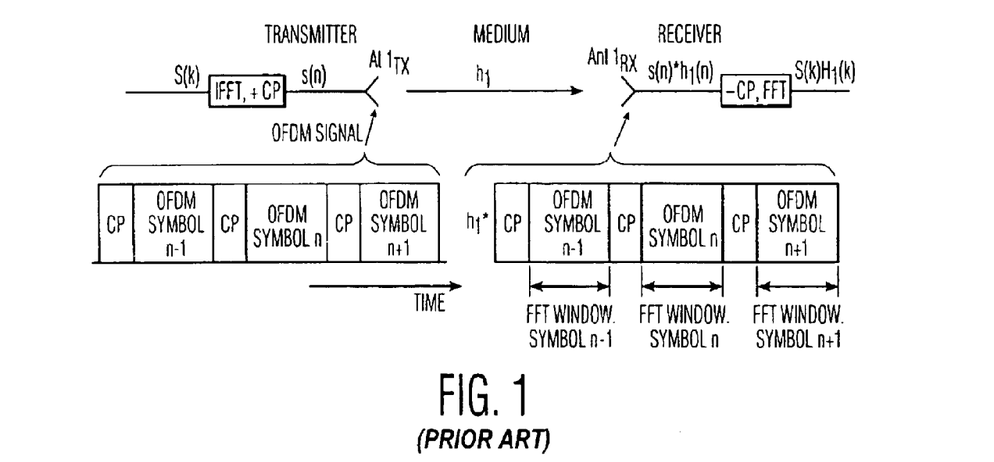
FIG. 1 illustrates a conventional transmitter and receiver employing a OFDM transmission scheme.

FIG. 1 illustrates a conventional transmitter and receiver which operate according to OFDM. The transmitter takes a symbol S(k) and performs an inverse fast Fourier transform (IFFT) to convert the symbol to be transmitted from the frequency domain into the time domain. The transmitter also adds a cyclic prefix (CP) to the symbol to be transmitted. The time domain symbol s(n) is transmitted via antenna Ant $1_{TX}$ over a transmission medium, e.g., an air interface, to a receiver. The transmission medium convolves the transmitted symbol with the channel impulse response $h_1$. The transmitted symbol is received via antenna Ant $1_{TX}$. The symbol as received by the receiver can be represented in the time domain by $s(n)*h_1(n)$. The receiver then removes the cyclic prefix and performs a fast Fourier transform (FFT). The received symbol in the frequency domain can be represented by $S(k)H_1(k)$, wherein S(k) is the received symbol in the frequency domain and $H_1(k)$ is the frequency representation of the channel, known as the channel transfer function.

Figure 2:
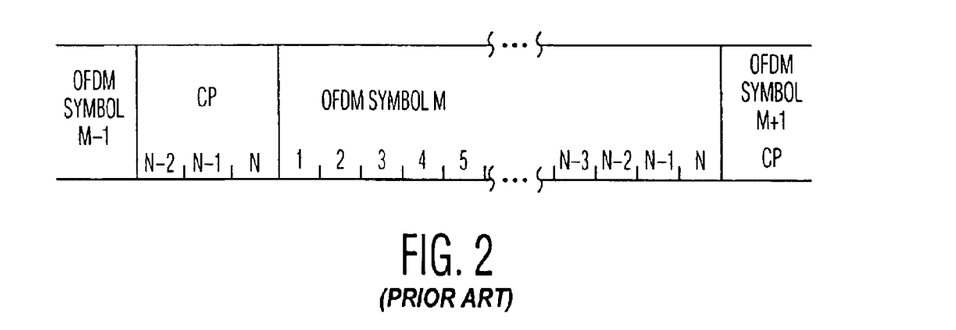
FIG. 2 illustrates a conventional OFDM symbol and associated cyclic prefix.

FIG. 2 illustrates a conventional OFDM symbol M and associated cyclic prefix. OFDM symbol M, as represented in the time domain, contains sample points 1 through N. The cyclic prefix that is associated with OFDM symbol M contains sample points N–2 through N of OFDM symbol M. Since multipath delays can destroy the orthogonality of the transmitted symbol, the cyclic prefix is set to a number of sample points which is longer than the worst case multipath delay between the transmitter and the receiver. Accordingly, one skilled in the art will recognize that although the cyclic prefix illustrated in FIG. 2 contains only three sample points, N–2 through N, the number of actual sample points in a cyclic prefix will vary depending upon the worst case multipath delay.

Typically, transmitted signals in different frequencies are affected differently by the transmission medium. However, transmitted signals in different frequencies may be subject to flat Rayleigh fading, i.e., fading which occurs across the whole frequency domain. Further, when the delay difference between multiple paths is significantly shorter than a sample point duration the phase of the signals in the multiple paths may either add up in phase constructively or may cancel each other out. When the phase of the signals in the multiple paths cancel each other out, the quality of the received signal depends upon whether one strong direct signal is received or whether scattered signals from many directions with random phase are received. When multiple scattered signals from many directions with random phase are received with a delay spread significantly smaller than the sample point duration, flat Rayleigh fading is caused in the frequency domain. For example, a receiver may not be able to recover any of the subcarriers associated with a transmitted OFDM symbol which experiences flat Rayleigh fading. When the transmitted OFDM symbol is subject to flat Rayleigh fading, the quality of service (QOS) will be severely degraded. One method for providing a better quality of service in a flat Rayleigh fading environment is to use transmission diversity.

Figure 3:
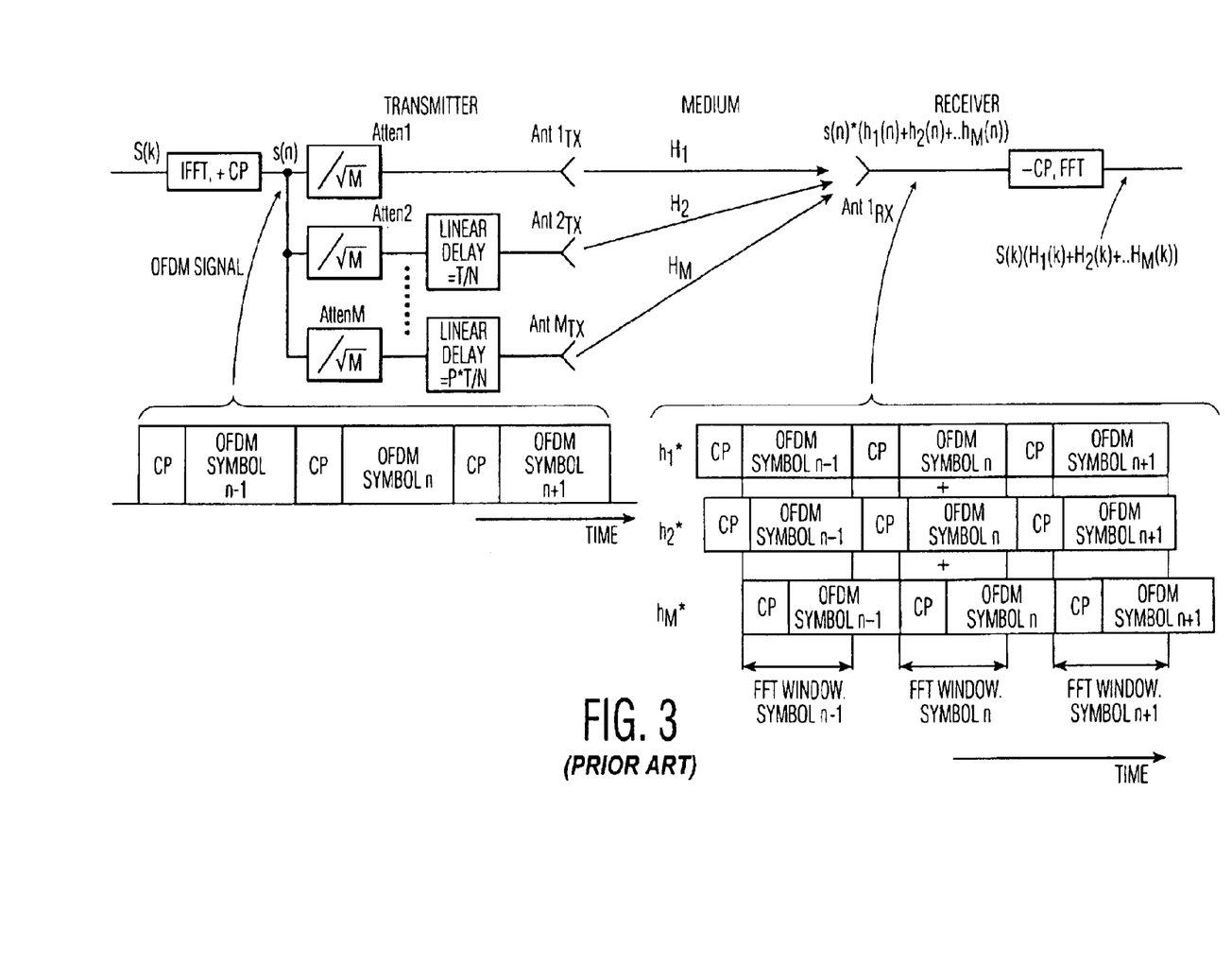
FIG. 3 illustrates a conventional transmitter and receiver which operate according to a OFDM transmission scheme using transmission diversity.

FIG. 3 illustrates a conventional transmitter and receiver which operate according to OFDM, wherein the transmitter transmits using transmission diversity. As illustrated in FIG. 3, transmission diversity is provided by employing a set of M of transmit antennas each of which transmit delayed versions of a symbol to be transmitted. One skilled in the art will recognize that transmission diversity is sometimes employed in a CDMA system, wherein independent delayed paths are resolved and then combined using, e.g., maximum ratio combining. When employing transmission diversity in an OFDM system, the transmit antennas should be positioned such that statistical independent channels are seen by the receiver. In other words, the transmitted symbol will be subject to individually independent flat Rayleigh fading channels. Employing a transmission diversity scheme, such as the one illustrated in FIG. 3, creates a coverage area where individual terminals experience a relatively uniform total received power without regard to position and time. Further, the transmission diversity scheme illustrated in FIG. 3 also creates pseudorandom frequency selectivity in the channel which also provides a more uniform receiving condition provided some type of coding is employed, i.e., forward error correction coding (FEC). One skilled in the art will recognize that word error rates, or OFDM symbol error rates, are lower for a FEC coded message in a fast uncorrelated Rayleigh fading channel than in a slow correlated Rayleigh fading channel. Accordingly, the delay based transmission diversity scheme illustrated in FIG. 3, is intended to introduce such uncorrelated frequency selectivity.

As illustrated in FIG. 3, the transmitter initially performs an inverse fast Fourier transform and then adds a cyclic prefix to a frequency domain symbol to be transmitted S(k). The inverse fast Fourier transform converts the frequency domain symbol S(k) into a time domain symbol s(n). The time domain symbol s(n) is sent along separate paths associated with each of the antennas. The time domain symbol s(n) passes through attenuators, Atten1 through AttenM, which attenuates the power of the transmitted symbol in each antenna path by the square root of the number of antennas used in the transmission diversity scheme to normalize the overall transmitted power. Other than in the first antenna path, the attenuated time domain symbol to be transmitted is then subject to a linear delay. The linear delay in each path can be represented by the following formula:

$$p*(T/N) \text{ for } p \text{ from } 0 \text{ to } M-1$$

where p is in the range of 0 to M−1
wherein p is an index to the antenna under consideration, M represents the total number of antennas in the diversity system, T represents the time duration of the OFDM symbol without a cyclic prefix, and N represents the number of subcarriers present in the frequency domain. The symbols transmitted from antennas Ant $1_{TX}$ through Ant $M_{TX}$ are respectively subjected to channel transfer functions $H_1$ through $H_M$ of the transmission medium. At the receiver the symbols from the antennas Ant $1_{TX}$ through Ant $M_{RX}$ are received by antenna Ant $1_{RX}$ and combined together. As illustrated in FIG. 3, after being combined in the receiver, the resultant symbol can be represented in the time domain by $s(n)*(h_1(n)+h_2(n)+ \ldots h_M(n))$. The receiver then removes the cyclic prefix and performs a fast Fourier transform to convert the time domain symbol into a frequency domain symbol.

Figure 4:
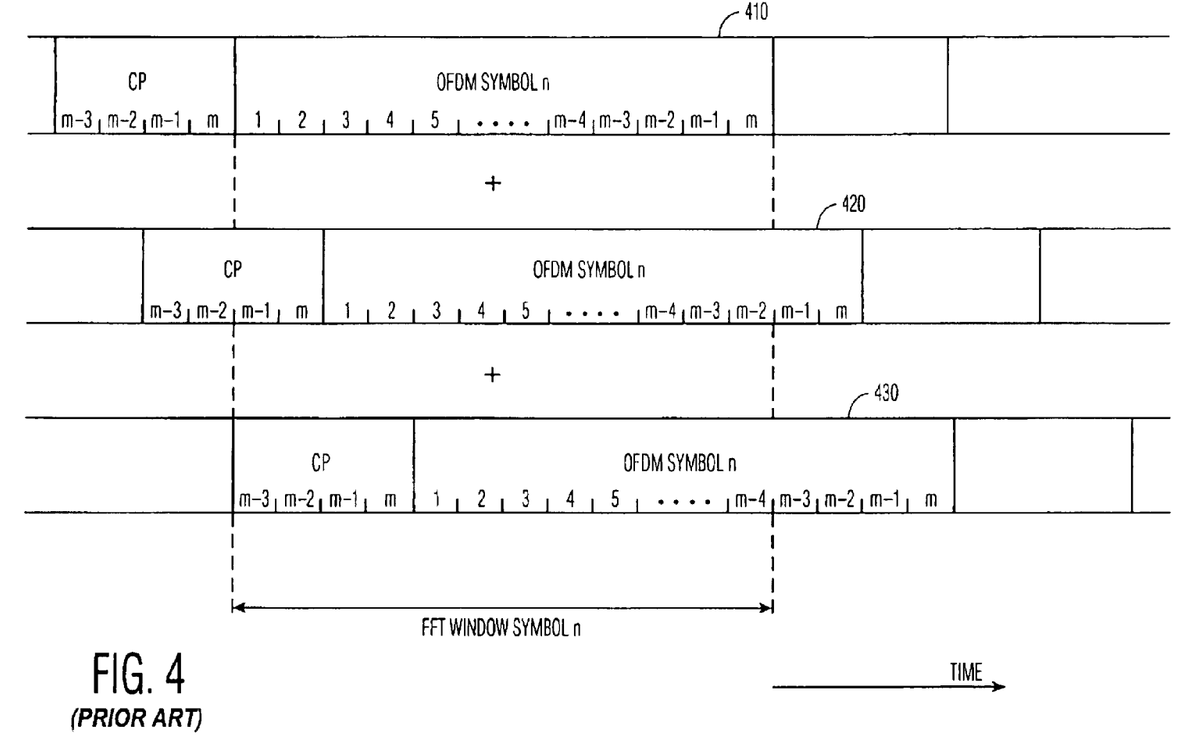
FIG. 4 illustrates a plurality of conventional OFDM symbols which are received by a receiver in a system which employs transmission diversity using linear delay.

FIG. 4 illustrates in more detail three symbols respectively transmitted from three antennas with different delays. At the receiver a fast Fourier transform is performed during a set period of time known as a fast Fourier transform window. As illustrated in FIG. 4, by using a cyclic prefix the fast Fourier transform window is performed over all the sample points of the transmitted OFDM symbol n of each of the delayed versions of the transmitted symbols.

In the frequency domain, the received symbol can be represented by:

$$R(k) = \frac{S(k)}{\sqrt{M}} \cdot \sum_{i=1}^{M} H_1(k) = S(k) \cdot H(k)$$

wherein S(k) is the sent symbol, M is the number of antennas and H(k) is the composite frequency response of the channel where the square root factor of M is included. Thus, the standard deviation of H(k) remains constant.

The received power according to Parsevals (DFT) theorem is:

$$P = \frac{1}{N} \sum_{k=0}^{N-1} R(k) \cdot R(k)^* = \frac{1}{N} \sum_{k=0}^{N-1} |h(k)|^2 |S(k)|^2$$

where R(k) is a frequency domain representation of the received symbol and R(k)* is the complex conjugate of R(k). Assuming that S(k) uses multilevel constellations, e.g., 16 QAM or 64 QAM, for each k, the average power level per subcarrier is:

$$P = E\left(\frac{1}{N} \sum_{k=0}^{N-1} |H(k)|^2 |S(k)|^2\right) = \frac{\sigma_s^2}{N} \sum_{k=0}^{N-1} |H(k)|^2$$

wherein E represents the expected value.

If it is assumed that transmission diversity system employs two antennas, wherein each antenna transmits over a path which is affected by a complex Gaussian attenuation variable $H_i$, i.e., a flat Rayleigh fading channel, and that the second diversity path is delayed by, e.g., one OFDM sampling point, the resulting transfer function then becomes:

$$H(k) = H_0 + H_1 \cdot e^{-\frac{j2\pi k}{N}}$$

Solving now for the received power results in the following:

$$P = \frac{\sigma_s^2}{N} \sum_{k=0}^{N-1} |H_0|^2 + |H_1|^2 + 2 \cdot |H_0| \cdot |H_1| \cos(arg(H_0) - arg(H_1))$$

$$= \frac{\sigma_s^2}{N}\left(N \cdot |H_0|^2 + N \cdot |H_1|^2 + 2 \cdot |H_0| \cdot |H_1| \cdot \sum_{k=0}^{N-1} \cos\left(\frac{-2 \cdot \pi \cdot k}{N}\right)\right)$$

$$= \sigma_s^2(|H_0|^2 + |H_1|^2)$$

$$= \sigma_s^2(H_{re0}^2 + H_{im0}^2 + H_{re1}^2 + H_{im1}^2)$$

where $H_{re}$ represents the real portion of the complex valued H and $H_{im}$ represents the imaginary portion of the complex valued H.

As seen above, the received power is a centrally distributed chi-square variable of degree four. If, however, there was no delay between the two transmitted symbols $H_0$ and $H_1$, the symbols can be merged together as H' before power summation over all subcarriers. The net result is then a chi-square variable of degree two, i.e., Rayleigh distributed. Although the example given above relates to a system employing two antennas, one skilled in the art will recognize that the degree n of the chi-square variable is equal to two times the number of antennas with different delays, i.e., n=2M.

The average value and standard deviation of a chi-square variable is:

$E(P)=n\sigma^2$, and $\sigma_P=\sqrt{2n}\cdot\sigma^2$, where $\sigma$ is the standard deviation of each Gaussian distributed variable that compose the chi-square distributed variable.

It should be noted that the relative spread, i.e., the stochastic deviation around the mean value of the power P, is reduced when the degree n is increased as:

$\sigma_P/E(P)=\sqrt{2/n}$

Figure 5:
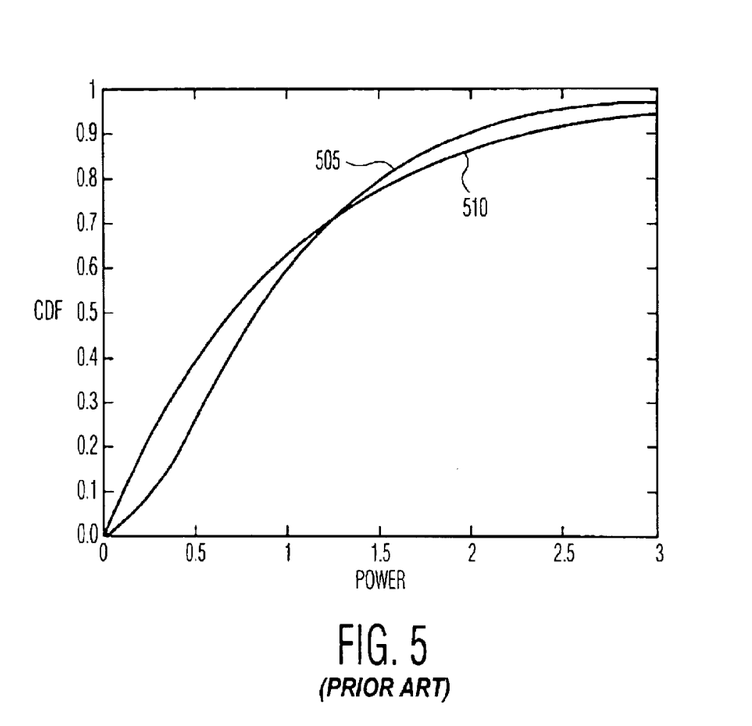
FIG. 5 illustrates a power carrier distribution function for transmission using two antennas.

FIG. 5 illustrates the power carrier distribution function (CDF) for M=2 antennas. Curve 505 illustrates the power carrier distribution function for two antennas with different delays, while curve 510 illustrates power carrier distribution function for transmission on two antennas with no delay. As can be seen from FIG. 5, using different delays for each antenna results in a steeper carrier distribution function curve. It will be recognized that carrier distribution function which is a vertical line indicates that there are no variations around the mean value, and hence, the symbol is deterministic, i.e., non-random. Accordingly, a steeper curve indicates that the overall power level is more deterministic.

Figure 6:
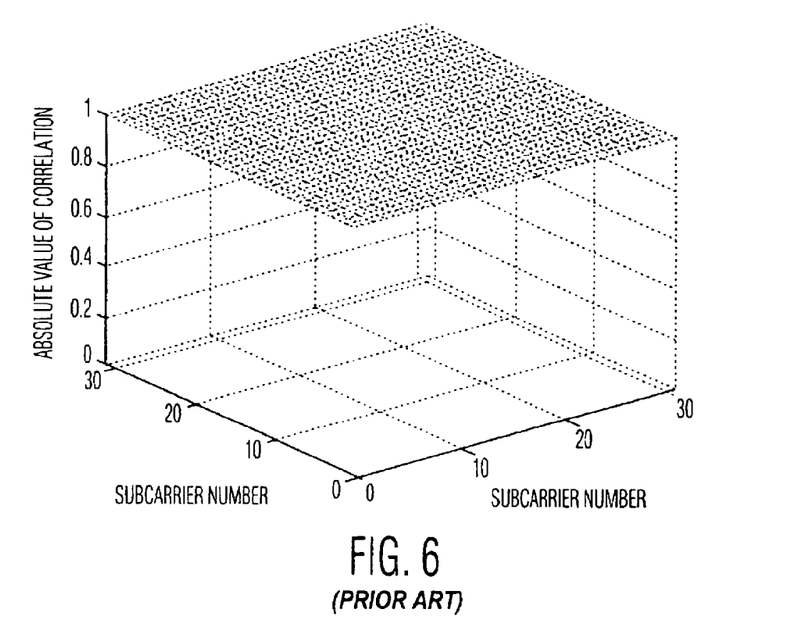
FIG. 6 illustrates a subcarrier covariance matrix for a system employing transmission diversity without delays between the various antennas.

FIG. 6 illustrates the subcarrier covariance matrix for transmission over six antennas without any delay of the symbol transmitted over the six antennas. As can be seen from FIG. 6, each subcarrier channel is correlated with all the other subcarrier channels when the antennas transmit the same symbol without a delay difference between the antennas. If the transmission channel subjects the transmitted symbol to a flat Rayleigh fading, the transmitted symbol of the six antennas will be similarly affected by the channel transfer function.

Figure 7:
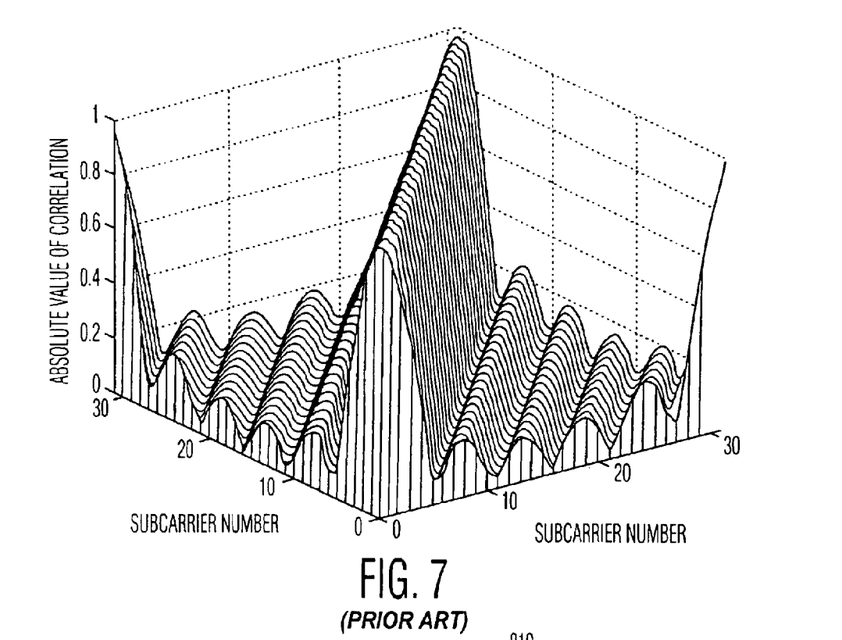
FIG. 7 illustrates a subcarrier covariance matrix for a transmission diversity scheme with delays between the symbols transmitted over each antenna.

FIG. 7 illustrates the subcarrier covariance matrix for the transmission of a symbol over six antennas with six different delays assuming a flat Rayleigh fading channel. As can be seen from FIG. 7, the subcarriers have a low value of correlation, i.e., most subcarriers have an absolute correlation value of less than 0.2. Accordingly, if the transmission medium subjected the symbols transmitted by the six antennas to a flat Rayleigh channel, most subcarriers would be affected differently by the channel.

Although the transmission of OFDM symbols using a plurality of antennas each with a different delay helps prevent the symbol being transmitted from being corrupted by flat Rayleigh fading, the total delay spread between all of the antenna paths can be no more than the duration of the cyclic prefix minus the duration of the inherent channel delay spread. It will be recognized that the delay spread is a measure of how distributed the different delays are with respect to each other. Introducing a greater delay would result in intersymbol interference, and subsequently the subcarriers would lose their mutual orthogonality. Accordingly, since the longer the cyclic prefix the less usable bandwidth is available for transmission of data, cyclic prefixes are typically kept as short as possible.

Accordingly, it would be desirable to provide a transmission diversity scheme using OFDM which is not limited by the duration of the cyclic prefix minus the duration of the inherent channel delay spread.

SUMMARY

These and other problems, drawbacks and limitations of conventional techniques are overcome according to the present invention by a method and/or an apparatus for transmitting a symbol, wherein the symbol is split among a plurality of antenna paths. In each antenna path the samples of the symbol are cyclically shifted a predetermined number of positions. The predetermined number of positions depends upon the relation of a particular antenna path with respect to the other antenna paths. Samples which are shifted out of the end of the symbol are inserted into the beginning of the symbol. Thereafter a cyclic prefix is formed by copying a predetermined number of samples from the end of the symbol.

In accordance with one embodiment of the present invention a signal is split along a plurality of antenna paths, wherein the signal includes a number of positions, each of the number of positions including a sample. The signal is received in an antenna path. The samples of the signal are shifted a predetermined number of positions, wherein samples shifted beyond the number of positions in the signal are shifted into a number of positions at a beginning or the end of the signal. A number of samples from an end of the signal in a guard interval and the signal and the guard interval are transmitted.

BRIEF DESCRIPTION OF THE DRAWINGS

The objects and advantages of the invention will be understood by reading the following detailed description in conjunction with the drawings in which.

DETAILED DESCRIPTION

The present invention is directed to transmission diversity, and more specifically to mitigating ISI by employing a cyclic delay in a transmission diversity system.

In the following, the present invention is described as being implemented in a system which communicates according to the OFDM protocol. However, one skilled in the art will recognize that the present invention is equally applicable to other protocols which employ cyclic prefixes or guard intervals. Further, although exemplary embodiments of the present invention are described below as employing a specific number of antennas, the present invention is equally applicable to systems with more antennas or less antennas than those described below.

Figure 8:
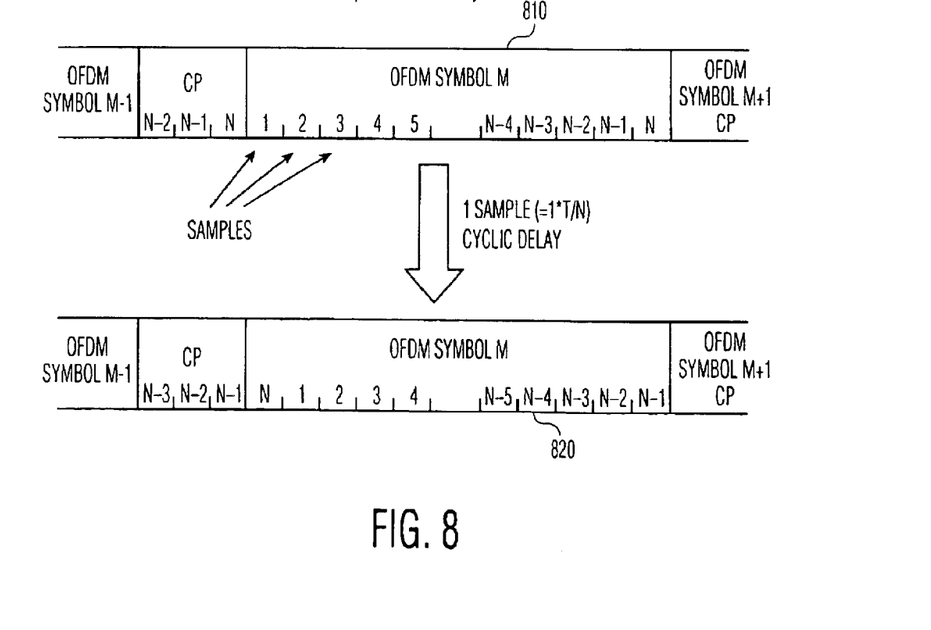
FIG. 8 illustrates two OFDM symbols wherein there is a cyclic delay between the two symbols in accordance with exemplary embodiments of the present invention.

FIG. 8 illustrates two OFDM symbols wherein a cyclic delay is implemented between the two symbols being transmitted in a transmission diversity scheme. Assume that OFDM symbol M 810 is transmitted over the antenna that has no cyclic delay and that OFDM symbol M 820 is transmitted over an antenna which has a cyclic delay of one sample. As can be seen by comparing OFDM symbols 810 and 820, the cyclic delay is implemented by shifting samples from the end of the OFDM symbol into the beginning of the OFDM symbol and adding a cyclic prefix by copying the last n samples of the OFDM symbol. For example, if a cyclic delay of three samples were implemented, the OFDM symbol transmitted over the third antenna would have the last three samples of the OFDM symbol shifted into the first three slots of the OFDM symbol and the remaining samples in the OFDM symbol would be shifted three places to the right. Then the last n samples of the OFDM symbol are copied and placed in the cyclic prefix, wherein n represents the number of samples in the cyclic prefix for a particular system.

Figure 9:
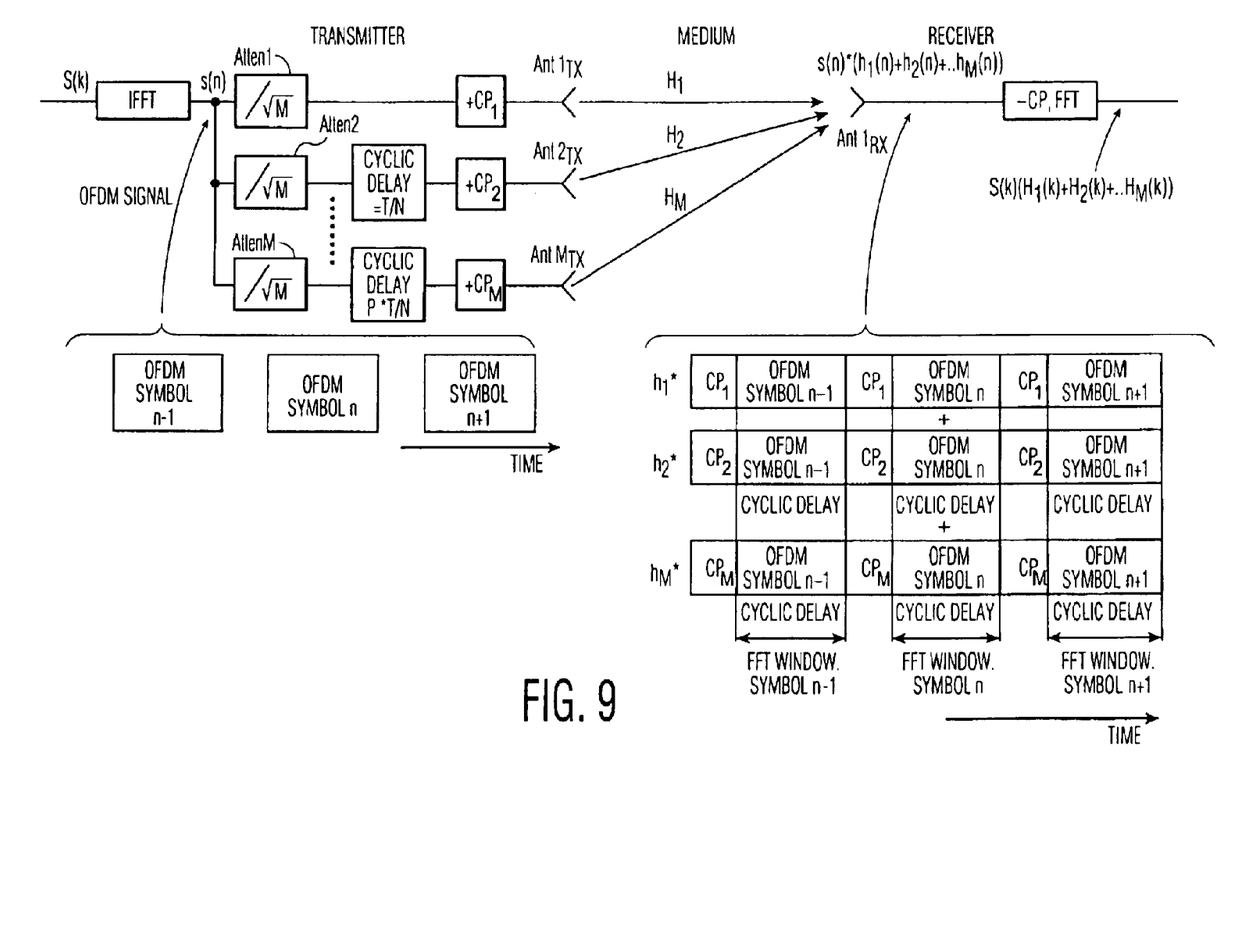
FIG. 9 illustrates a transmitter and receiver employing transmission diversity and cyclic delay in accordance with exemplary embodiments of the present invention.

FIG. 9 illustrates a transmitter and receiver which operate according to a OFDM transmission scheme employing transmitter diversity. The transmitter performs an inverse fast Fourier transform on a frequency domain symbol S(k) to convert the symbol to the time domain symbol s(n). The time domain symbol s(n) is then passed through each antenna path of the diversity system. In each antenna path the time domain symbol s(n) is passed through an attenuator which preferably attenuates each symbol by a factor of the square root of the number of antennas being used to transmit to normalize the power. One skilled in the art will recognize that other weighting factors can be implemented using, for example, power amplifiers. When the FEC code and the interleaver design are fixed optimum performance of the system can be achieved by selecting both the cyclic delay as well as the weighting factors.

After the signal has been attenuated, the first antenna path adds the cyclic prefix and transmits the symbol from the antenna. Each subsequent antenna path performs the cyclic delay on the symbol and then adds the cyclic prefix to the symbol to be transmitted. The symbol is then transmitted through the respective antennas. As the symbols pass through the transmission medium, they are each subjected to the respective channel transfer functions $H_1$ through $H_M$.

The receiver receives each of the symbols being transmitted from the antennas as a combined symbol and reconstructs the transmitted OFDM symbol. Accordingly, in the time domain the receiver has a symbol which comprises the transmitted symbol s(n) which is combined with a sum of the channel transfer function caused by the transmission medium $h_1(n)$ through $h_M(n)$. The receiver then removes the cyclic prefix and performs a fast Fourier transform to convert the symbol from the time domain into the frequency domain. By performing the fast Fourier transform the cyclic delay is converted into a phase factor. One skilled in the art will recognize that subsequent equalization of the received symbol removes the phase factor.

Comparing FIG. 3 and FIG. 9, wherein FIG. 3 illustrates a linear delay for a transmit diversity scheme and FIG. 9 illustrates a cyclic delay for a transmit diversity scheme, it can be seen that the cyclic delay is not limited by the size of the cyclic prefix. Accordingly, where a system which employs a linear delay is limited to using a number of antennas which correspond with the number of samples in the cyclic prefix, a system which uses a cyclic delay is only limited to using a number of antennas equal to the number of samples in the OFDM symbol. Further, by using a cyclic delay, intersymbol interference is not generated, and hence, the orthogonality between the subcarriers remains intact.

Figure 10:
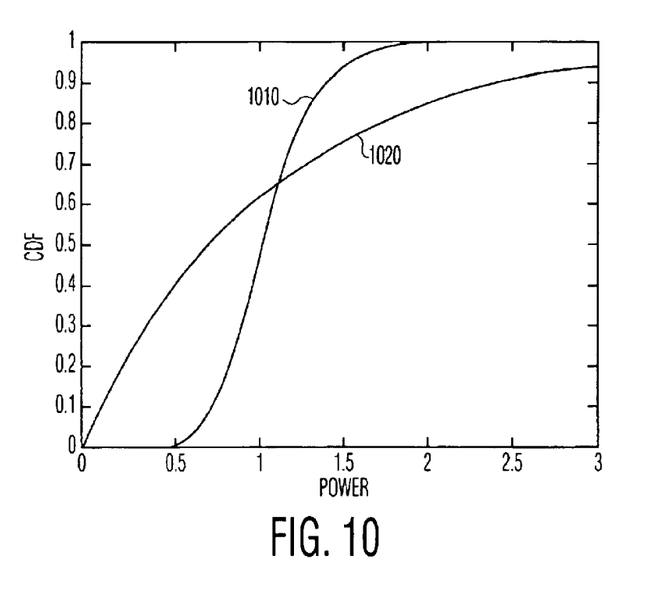
FIG. 10 illustrates a power carrier distribution function for the transmission over a plurality of antennas in accordance with an exemplary embodiment of the present invention.

FIG. 10 illustrates the power carrier density function for diversity transmission using M antennas. Curve 1010 illustrates the power carrier density function for the transmission using a cyclic delay of 16, i.e., a transmission diversity employing 16 antennas and 15 different cyclic delays. Curve 1020 illustrates the power carrier density function for a transmission employing 16 antennas and no delay. As illustrated in FIG. 10, the implementation of a cyclic delay results in a steeper curve which indicates that the overall power level is more deterministic, i.e., non-random.

Figure 11:
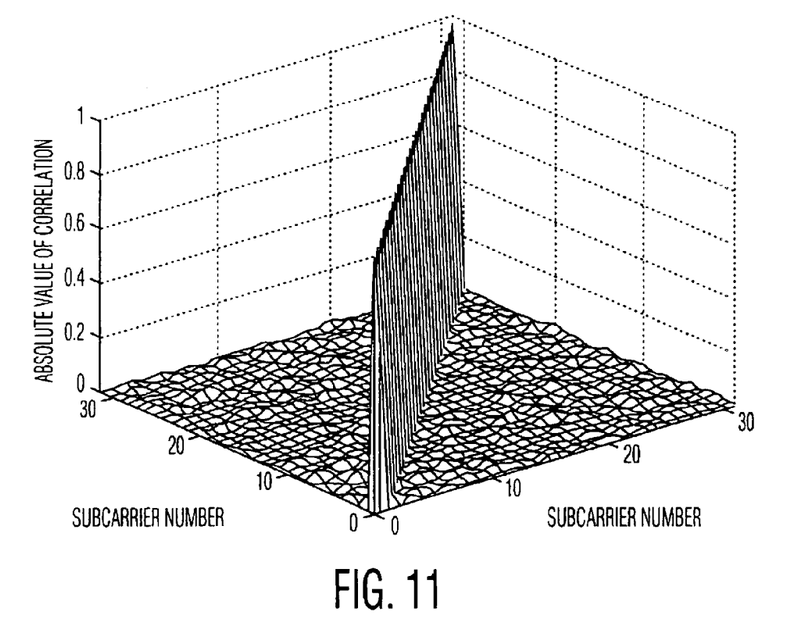
FIG. 11 illustrates a subcarrier covariance matrix for a transmission diversity scheme employing cyclic delay in accordance with an exemplary embodiment of the present invention.

FIG. 11 illustrates the subcarrier covariance matrix for a transmission diversity system which employs 32 cyclic delays. As illustrated in FIG. 11, all of the subcarriers are uncorrelated with each other. Since each subcarrier channel transfer function is made up of a summation of complex Gaussian variables, the resulting subcarrier channel will have the same statistics, but any other subcarrier will be independently fading, i.e., each subcarrier reacts independently to the fast Rayleigh fading.

Figure 12:
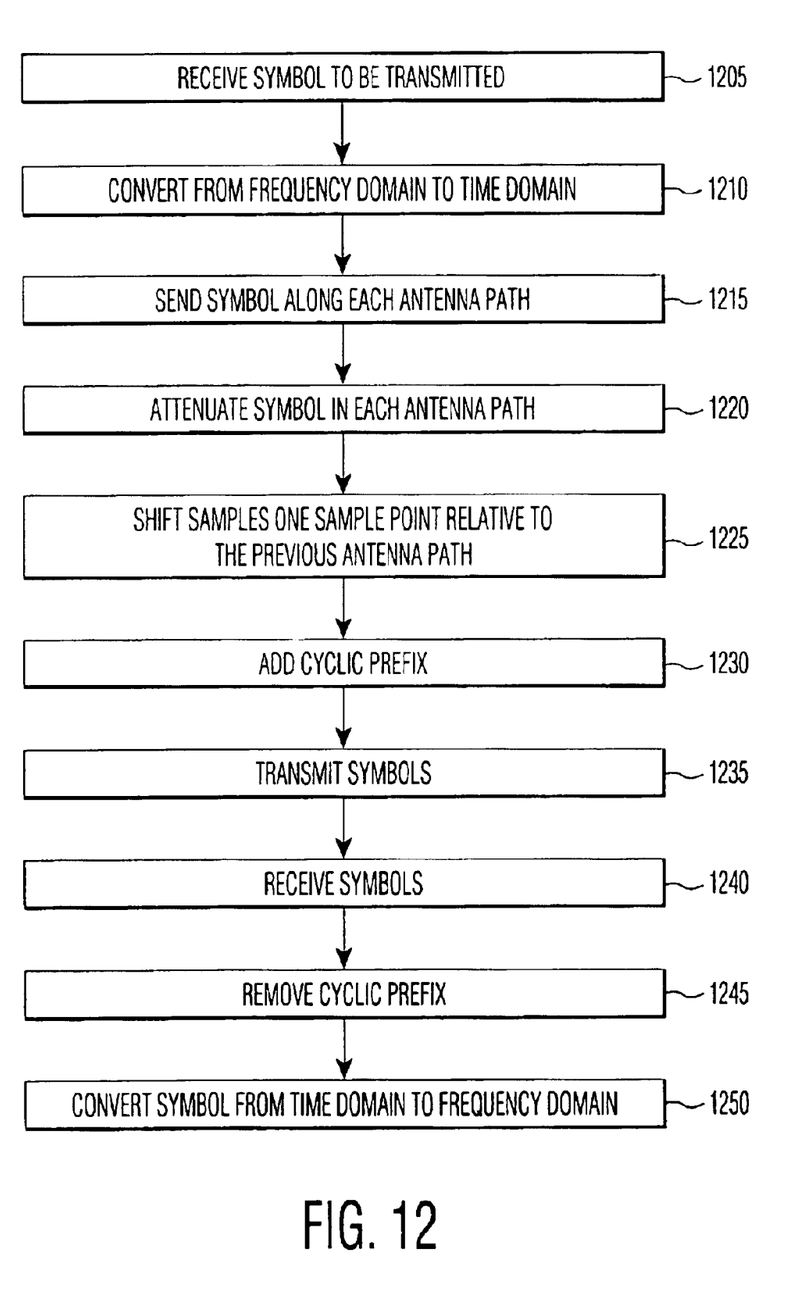
FIG. 12 illustrates an exemplary method for employing cyclic delay in accordance with the present invention.

FIG. 12 illustrates an exemplary method for employing cyclic delay in accordance with the present invention. The transmitter receives the symbol to be transmitted (step 1205). The symbol is converted from the frequency domain to the time domain by performing an inverse fast Fourier transform (step 1210). The time domain symbol is sent along each antenna path (step 1215). In each antenna path the symbol is attenuated by the square root of the number of antennas (step 1220). In each antenna path the samples are shifted one sample point, relative to the previous antenna path, to the right in the OFDM symbol (step 1225). For example, in the first antenna path the samples are not shifted, while in the sixth antenna path the samples are shifted five spaces. In each antenna path after the samples have been shifted, a cyclic prefix is added (step 1230). The cyclic prefix added in each antenna path includes the last n samples of the end of the OFDM symbol. The transmitter then transmits the symbols from the various antennas (step 1235). The receiver receives the combined symbols (step 1240) and removes the cyclic prefix (step 1245). The received symbol is then converted from the time domain to the frequency domain using a fast Fourier transform (step 1250).

It will be recognized that to reduce the effects of channel impairments on a transmitted signal forward error correction (FEC) coding and interleaving can be performed on the transmitted signal. To understand how coding and interleaving can be performed in accordance with the present invention, the correlation between subcarriers should be examined. Accordingly, the correlation between subcarrier k and k' when implementing a transmit delay diversity method using two transmit antennas, can be illustrated by the equation below:

$$\rho(k,k') = E\left\{\left(H_1 + H_2 \cdot e^{\frac{-i2\pi kt}{N}}\right) \cdot \left(H_1 + H_2 \cdot e^{\frac{-i2\pi k't}{N}}\right)^*\right\}$$

$$\rho(k,k') = E\left\{|H_1|^2 + |H_2|^2 \cdot e^{\frac{-i2\pi(k-k')t}{N}} + H_1 \cdot H_2^* \cdot e^{\frac{i2\pi k't}{N}} + H_1^* \cdot H_2 \cdot e^{\frac{-i2\pi kt}{N}}\right\}$$

$$\rho(k,k') = \sigma_1^2 + \sigma_2^2 \cdot e^{\frac{-i2\pi(k-k')t}{N}}$$

wherein k and k' are the subcarrier indexes, t is a fixed cyclic delay, $H_1$ and $H_2$ represent the channel impairments for each subcarrier, N is the total number of subcarriers, σ is the standard deviation and E is the expectation value (i.e., the average over all possible channel realizations). One skilled in the art will recognize that the correlation illustrated above is not normalized for the number of antennas. For multiple antennas the correlation between subcarriers k and k' can be represented by the equation below:

$$\rho(k,k') = \sigma_1^2 + \sigma_2^2 \cdot e^{\frac{-i2\pi(k-k')t_1}{N}} + \sigma_3^2 \cdot e^{\frac{-i2\pi(k-k')t_2}{N}} + \ldots$$

One skilled in the art will recognize that the correlation described by the formula above is similar to the frequency response of a finite impulse response (FIR) digital filter with all weights identically set. Apart from various cyclic delays, other weights can be employed for each antenna. Accordingly, the desired characteristic of ρ(k,k') can be designed in a similar fashion to the manner in which an FIR digital filter is designed, e.g., using a digital filter design software package.

When transmitting it would be desirable to have a stream of symbols where adjacent symbols are uncorrelated which improves the FEC decoding process and so that the channel transfer function and impairments should affect the subcarriers differently. To determine uncorrelated subcarriers, the following formula could be used:

$$\rho(k,k') = \frac{1}{M}\left(1 + e^{\frac{-i2\pi(k-k')t_1}{N}} + e^{\frac{-i2\pi(k-k')t_2}{N}} \ldots\right)$$

In the formula above each antenna uses an amplitude weight of 1 so that the correlation value is normalized with respect to the number of antenna used.

Figure 13A:
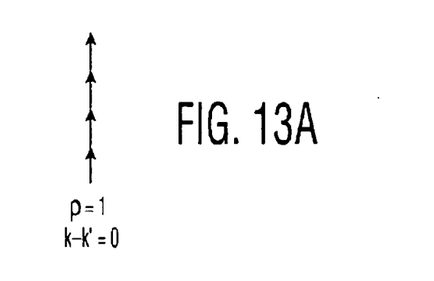
FIGS. 13A–13C illustrate the subcarrier channel correlation between subcarriers in accordance with an exemplary embodiment of the present invention.
Figure 13B:
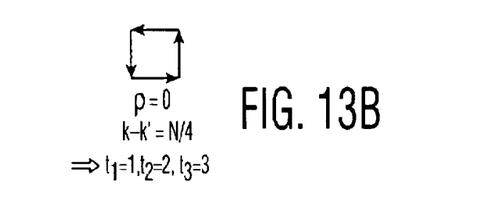
Figure 13C:
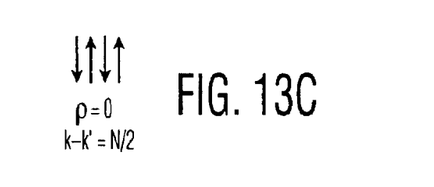

FIGS. 13A–13C illustrate the subcarrier channel correlation between subcarriers k and k' in a transmit diversity system which employs four antennas. Each arrow illustrated in FIGS. 13A–13C represents an output of one of the four antennas in the subcarrier correlation between subcarriers k and k'. As can be seen from FIGS. 13B and 13C, the cyclic delays $t_1$, $t_2$ and $t_3$ are chosen such that subcarriers separated with k–k'=N/4 and k–k'=N/2 have a zero correlation. Furthermore, as illustrated by FIG. 13A, when k–k'=0 the subcarriers are completely correlated. Although FIGS. 13A–13C illustrate a system which employs four antennas, it will be recognized that the approach described above in connection with FIGS. 13A–13C can be implemented with an arbitrary number of antennas.

Figure 14:
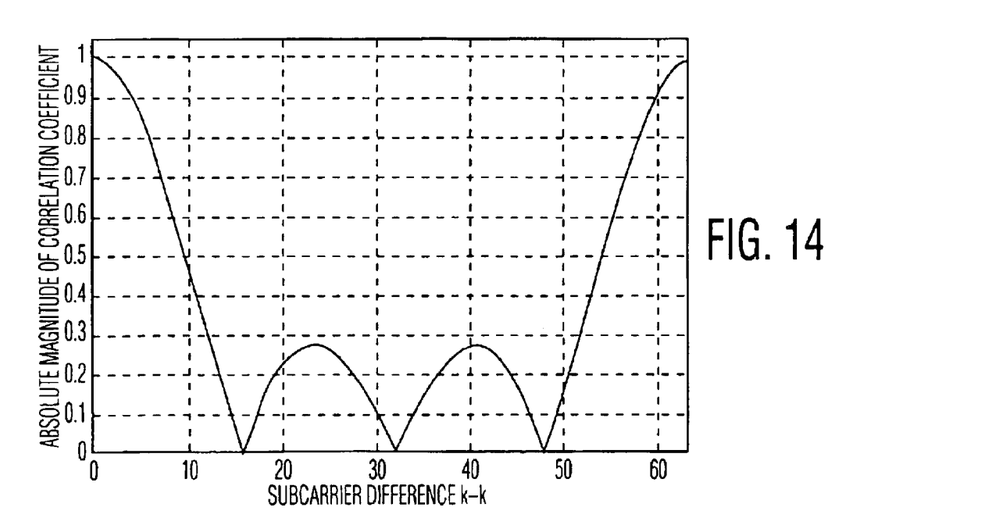
FIG. 14 illustrates the absolute magnitude of correlation between two subcarriers in a system transmitting 64 subcarriers in accordance with an exemplary embodiment of the present invention.

FIG. 14 illustrates the correlation characteristic for all subcarrier differences using the same cyclic delays selected above in connection with FIGS. 13A–13C for N=64 subcarriers. It will be recognized that FIG. 14 shows a more comprehensive picture of the subcarrier correlations compared to FIGS. 13A–13C. Based upon the subcarrier correlation characteristic illustrated in FIGS. 13A–13C and FIG. 14, it will be recognized that the convolutional code applied to the transmitted signal should be preceded by an interleaver which provides symbols from subcarrier i, i+N/4, i+N/2, i+3N/2, i+1, i+1+N/4, . . . Accordingly, every fourth symbol in the Viterbi decoder at the receiver should be correlated, whereas the preceding three symbols are uncorrelated. One skilled in the art will recognize that the Viterbi decoder may be replaced by a decoder which uses either Fano or the Stack algorithm. If the response of the channel H is flat, and Rayleigh distributed, a suitable convolutional code may preferably be selected with a memory length aligned with the total length of the uncorrelated subcarriers, i.e., 4.

Figure 15:
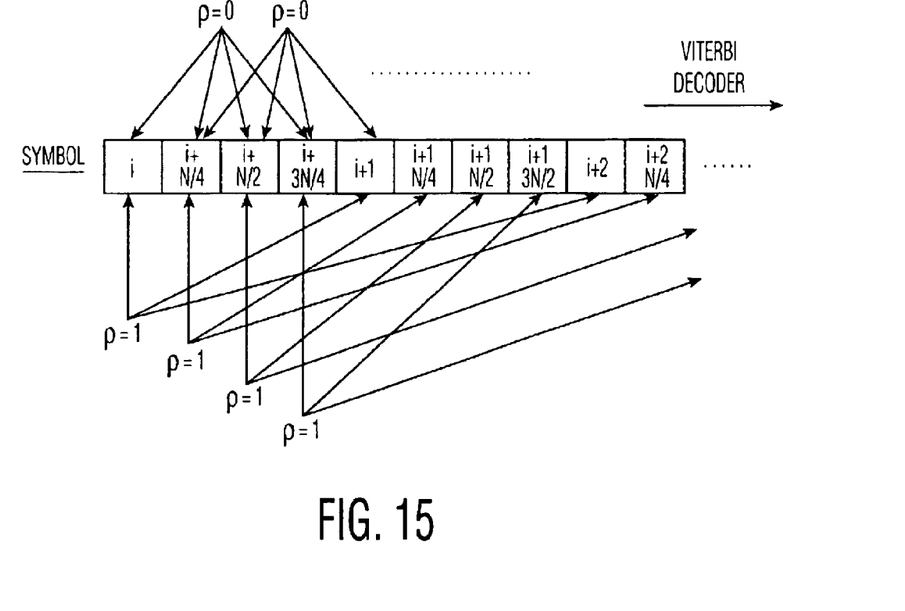
FIG. 15 illustrates the input stream to a convolutional FEC decoder in the receiver in accordance with an exemplary embodiment of the present invention.

FIG. 15 illustrates the input stream to a Viterbi decoder in a receiver where there is a deterministic repetition distance between symbols of the input stream which experience the same channel characteristics. Based upon the correlation characteristics described above in connection with FIGS. 13A–13C and 14, the input stream of symbols are interleaved as illustrated in FIG. 15. More specifically, the symbols are interleaved such that every fourth symbol is correlated. Accordingly, if the channel transfer function were to affect two or three adjacent symbols, these symbols would not be affected the same by the channel transfer function because these adjacent symbols are uncorrelated.

Although exemplary embodiments of the present invention are described above as implementing cyclic delay by shifting samples from the end of an OFDM symbol into the beginning of the OFDM symbol, the present invention can also be implemented so that the samples from the beginning of the OFDM symbol are shifted into the end of the OFDM symbol. In addition, although the system is described above as implementing a predetermined cyclic delay value based upon the position of the antenna relative to the previous antenna, the present invention can also be implemented by changing the cyclic delay value occasionally. For example, if a first transmission fails due to channel fading, the retransmission may be subject to a different cyclic delay to increase the success of the retransmission. It will be recognized that the cyclic delay should not be changed more often than channel estimate pilot signals are sent.

Furthermore, although the description of the receiver above describes the receiver as having only a single antenna path, the receiver can also be implemented with a plurality of antenna paths. If the receiver includes a plurality of antenna paths, the receiver can perform maximum ratio combining using the received signals from each of the plurality of antenna paths. Further, although the present invention has been described in connection with OFDM protocol, one skilled in the art will recognize that the present invention is equally applicable as a complement to other transmit diversity methods or in other space-time coding scenarios.

In addition, although the present invention has been described as copying the last n samples of the OFDM symbol and placing the copied samples in a cyclic prefix, it will be recognized that the present invention may also implement a cyclic suffix. To implement a cyclic suffix, the first n samples of the OFDM symbol is copied and placed in a guard interval after the OFDM symbol. Accordingly, this guard interval after the OFDM symbol can be referred to as a cyclic suffix.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. In a radio communication system, a method of transmitting a signal, comprising the steps of:

feeding the signal to a plurality of antenna paths, wherein the signal includes a number of positions, each of the number of positions including a sample;

receiving the signal in each of the plurality of antenna paths;

for each antenna path, shifting the samples of the signal a predetermined direction and number of positions, wherein the predetermined direction and/or number of positions are different for at least two of the antenna paths, said shifting step including:

when shifting sampler toward the end of the signal, shifting samples that are shifted beyond the number of positions in the signal into a corresponding number of positions at a beginning of the signal; and when shifting samples toward the beginning of the signal, shifting samples that are shifted beyond the number of positions in the signal into a corresponding number of positions at the end of the signal;

in each antenna path, including a number of samples from the beginning or the end of the signal in a cyclic prefix;

transmitting the signal and the cyclic prefix from each of the plurality of antenna paths in a first transmission attempt;

determining whether the signal needs to be retransmitted due to fading of the first transmission attempt;

if the signal needs to be retransmitted, shifting the samples of the signal in each antenna path a different predetermined direction and/or number of positions than were utilized in the first transmission attempt;

in each antenna path, including a different number of samples from the beginning or the end of the signal in a new cyclic prefix; and retransmitting the signal and the new cyclic prefix from each of the plurality of antenna paths in a second transmission attempt.

2. The method of claim 1, wherein the predetermined number of positions utilized in the first transmission attempt corresponds to a position of the antenna path with respect to the number of antenna paths.

3. In a radio communication system, a method of transmitting a signal comprising the steps of:

feeding the signal to a plurality of antenna paths; wherein the signal includes a number of positions, each of the number of positions including a sample;

receiving the signal in each of the plurality of antenna paths;

for each antenna path, shifting the samples of the signal a predetermined direction and number of positions, wherein the predetermined direction and/or number of positions predetermined of position are different for at least two of the antenna paths, and the predetermined number of positions corresponds to whether the signal is being retransmitted, said shifting step including:

when shifting samples toward the end of the signal, shifting samples that are shifted beyond the number of positions in the signal into a corresponding number of positions at a beginning of the signal; and when shifting samples toward the beginning of the signal, shifting samples that are shifted beyond the number of positions in the signal into a corresponding number of positions at the end of the signal;

in each antenna path, including a number of samples from the beginning or the end of the signal in a cyclic prefix; and transmitting the signal and the cyclic prefix from each of the plurality of antenna paths.

4. The method of claim 1, wherein the signal is an orthogonal frequency division multiplexed symbol.

5. The method of claim 1, further comprising the steps of:
applying error protection coding to the signal;
interleaving the samples, wherein the samples are interleaved such that after de-interleaving, subcarriers with a lowest correlation are placed in positions next to each other;
performing an inverse fast Fourier transform on the interleaved coded symbols to form a resultant signal; and
providing the resultant signal to each of the antenna paths.

6. The method of claim 1, further comprising the steps of:
performing an inverse fast Fourier transform on the signal; and
attenuating the signal in each antenna path.

7. An apparatus for transmitting signals comprising:
an input for receiving a signal to be transmitted, wherein the signal to be transmitted includes a number of positions, each of the number of positions including a sample;
a first antenna path;
a second antenna path, wherein the second antenna path shifts the samples of the signal a predetermined number of positions, wherein samples shifted beyond the number of positions in the signal are shifted the predetermined number of positions into a beginning or an end of the signal;
a transmitter for transmitting the signal from the first antenna path and the shifted signal from the second antenna path in a first transmission attempt; and
means for determining whether the signal needs to be retransmitted due to fading of the first transmission attempt;
wherein, in response to a determination the signal needs to be retransmitted the second antenna path shifts the sample of the signal a different number of positions than were utilized in the first transmission attempt, and the transmitter retransmits the signal from the first antenna path and the differently shifted signal from the second antenna path in a second transmission attempt.

8. The apparatus of claim 7, further comprising:
a third antenna path, wherein the third antenna path shifts the samples of the signal another predetermined number of positions,
wherein samples shifted beyond the number of positions in the signal are shifted the another predetermined number of positions into a beginning or an end of the signal.

9. The apparatus of claim 8, wherein the predetermined number of positions corresponds to a position of the second antenna path with respect to the first and third antenna paths and the another predetermined number of positions corresponds to a position of the third antenna path with respect to the first and second antenna paths.

10. The apparatus of claim 7, wherein the samples are shifted toward the end of the signal and wherein samples shifted beyond the end of the signal are shifted into the beginning of the signal.

11. The apparatus of claim 7, wherein the samples are shifted toward the beginning of the signal and wherein samples shifted beyond the beginning of the signal are shifted into the end of the signal.

12. The apparatus of claim 7, further comprising:
means for applying an error correction code to signal; and
an interleaver.

13. The apparatus of claim 7, wherein the first and second antenna paths include means for adding a guard interval to the signal in the respective antenna path prior to transmission of the signal from each antenna path.

14. The apparatus of claim 13, wherein the guard interval is added to the beginning of the signal.

15. The apparatus of claim 13, wherein the guard interval is added to the end of the signal.

16. A radio communication system comprising:
a transmission portion including:
an input for receiving a signal to be transmitted, wherein the signal to be transmitted includes a number of positions, each of the number of positions including a sample;
a first antenna path;
a second antenna path, wherein the second antenna path shifts the samples of the signal a predetermined number of positions, wherein samples shifted beyond the number of positions in the signal are shifted the predetermined number of positions into a beginning or an end of the signal; and
a transmitter for transmitting the signal from the first antenna path and the shitted signal from the second antenna path in a first transmission attempt; and
a receiving portion including:
a receiver that includes a first and second antenna path, wherein the receiver enhances signal quality by combining signals received on the first and second antenna paths;
means for reporting to the transmission portion whether the signal needs to be transmitted due to fading of the first transmission attempt;
wherein, in response to receiving a report that the signal needs to be retransmitted, the second antenna path shifts the samples of the signal a different number of positions than were utilized in the first transmission attempt, and the transmitter retransmits the signal from the first antenna path and the differently shifted signal from the second antenna path in a second transmission attempt.

17. The system of claim 16, wherein the samples are shifted toward the end of the signal and wherein samples shifted beyond the end of the signal are shifted into the beginning of the signal.

18. The system of claim 16, wherein the samples are shifted toward the beginning of the signal and wherein samples shifted beyond the beginning of the signal are shifted into the end of the signal.

19. The system of claim 16, wherein
the transmitter further includes
  means for performing an inverse fast Fourier transform; and
  means for adding a prefix to the signal in each antenna path; and
the receiver further includes
  means for removing the prefix; and
  means for performing a fast Fourier transform.

20. The system of claim 16 wherein
the transmitter further includes
  means for applying error protection coding to the signal to form coded symbols; and
  means for interleaving the coded symbols;
the receiver further includes
  means for removing de-interleaving received subcarriers; and
  means for decoding the de-interleaved subcarriers,
wherein the coded symbols are interleaved such that after de-interleaving, subcarriers with a lowest correlation are placed in positions next to each other.

21. The system of claim 16, wherein the signal quality enhancing combining is a maximum ratio combining.

* * * * *

UNITED STATES PATENT AND TRADEMARK OFFICE
CERTIFICATE OF CORRECTION

PATENT NO. : 6,842,487 B1
APPLICATION NO. : 09/667504
DATED : January 11, 2005
INVENTOR(S) : Larsson Page 1 of 1

It is certified that error appears in the above-identified patent and that said Letters Patent is hereby corrected as shown below:

In Column 3 Line 54, insert -- where $\sigma_s^2 = E(|S(k)|^2)$ -- before paragraph "wherein E ...value.".

In Column 4, Line 11, delete " $\sigma_S^2(H_{re0}^2 + H_{tm0}^2 + H_{re1}^2 + H_{tm1}^2)$ "

and insert -- $\sigma_S^2(H_{re0}^2 + H_{im0}^2 + H_{re1}^2 + H_{im1}^2)$ -- therefor.

In Column 10, Line 34, in Claim 1, delete "sampler" and insert -- samples --, therefor.

In Column 11, Line 6, in Claim 3, after "positions" delete "predetermined of position".

In Column 11, Line 57, in Claim 7, after "determination" insert -- that --.

In Column 11, Line 59, in Claim 7, delete "sample" and insert -- samples --, therefor.

In Column 12, Line 42, in Claim 16, delete "shitted" and insert -- shifted --, therefor.

In Column 12, Line 50, in Claim 16, delete "transmitted" and insert -- retransmitted --, therefor.

Signed and Sealed this

Thirtieth Day of October, 2007

JON W. DUDAS
*Director of the United States Patent and Trademark Office*

UNITED STATES PATENT AND TRADEMARK OFFICE
CERTIFICATE OF CORRECTION

PATENT NO. : 6,842,487 B1
APPLICATION NO. : 09/667504
DATED : January 11, 2005
INVENTOR(S) : Larsson It is certified that error appears in the above-identified patent and that said Letters Patent is hereby corrected as shown below:

In Column 3 Line 54, insert -- where $\sigma_s^2 = E(|S(k)|^2)$ -- before paragraph "wherein E ...value.".

In Column 4, Line 11, delete " $\sigma_s^2 (H_{re0}^2 + H_{im0}^2 + H_{re1}^2 + H_{im1}^2)$ "

and insert -- $\sigma_s^2 (H_{re0}^2 + H_{im0}^2 + H_{re1}^2 + H_{im1}^2)$ -- therefor.

In Column 10, Line 34, in Claim 1, delete "sampler" and insert -- samples --, therefor.

In Column 11, Line 6, in Claim 3, after "positions" delete "predetermined of position".

In Column 11, Line 57, in Claim 7, after "determination" insert -- that --.

In Column 11, Line 59, in Claim 7, delete "sample" and insert -- samples --, therefor.

In Column 12, Line 42, in Claim 16, delete "shitted" and insert -- shifted --, therefor.

In Column 12, Line 50, in Claim 16, delete "transmitted" and insert -- retransmitted --, therefore.

Signed and Sealed this

Twenty-seventh Day of November, 2007

JON W. DUDAS
*Director of the United States Patent and Trademark Office*